July 19, 1960 M. U. ZIMMERMAN, JR 2,945,515
LIQUEFIED GAS HANDLING SYSTEM
Filed June 4, 1958
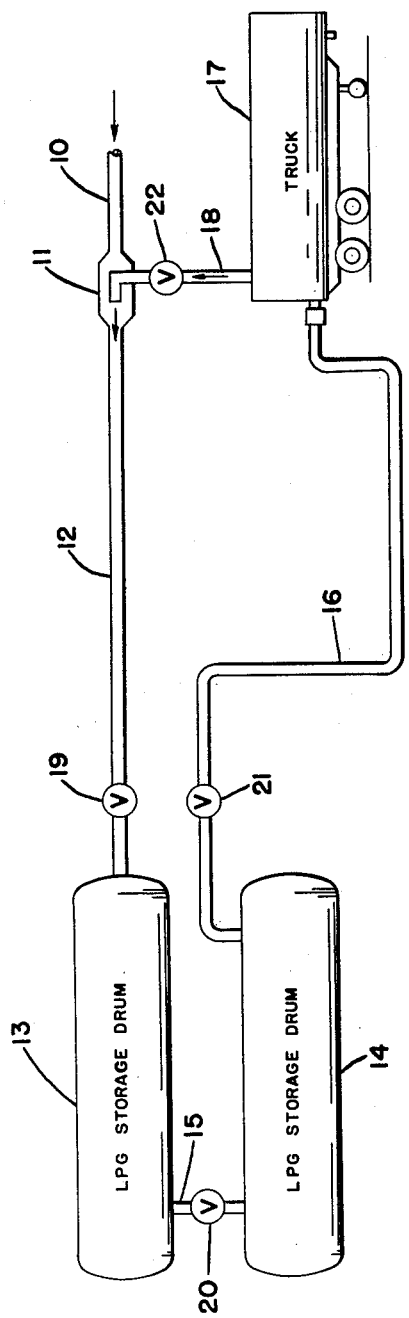
INVENTOR.
MARLIN U. ZIMMERMAN, JR.
BY
ATTORNEY

United States Patent Office 2,945,515
Patented July 19, 1960

2,945,515

LIQUEFIED GAS HANDLING SYSTEM

Marlin U. Zimmerman, Jr., Shaker Heights, Ohio, assignor to The Standard Oil Company, Cleveland, Ohio, a corporation of Ohio Filed June 4, 1958, Ser. No. 739,871

3 Claims. (Cl. 141—59)

The present invention relates to a system for the handling of liquefied gas. More particularly, the invention relates to a system for handling liquefied petroleum gases and to the transfer of such gases from storage facilities to transportation facilities.

Liquefied gases are of necessity handled under moderate to high pressures; consequently, the handling of these gases involves problems not encountered in the handling of ordinary liquids which are usually handled at atmospheric pressure. The use of such gases is continually increasing and, in particular, the liquefied petroleum gas industry has expanded rapidly in recent years. The need for improved handling systems for such gases has increased correspondingly. Liquefied petroleum gas has many industrial and domestic uses including cooking, heating, etc.

Liquefied petroleum gas is usually a mixture of light hydrocarbons. The predominant constituent is usually propane but various other light hydrocarbons such as ethane, ethylene, propylene, butane and butylenes may also be included. It is produced in substantial quantity as a by-product of normal petroleum refining operations, particularly those operations employing catalytic methods such as catalytic cracking and catalytic reforming.

In the past it has been the practice to transfer the liquefied petroleum gas from the producing facility to storage facilities such as high-pressure drums. When the product is needed, it is pumped from the storage drums into trucks, tank cars, barges and the like for transport to other locations.

It is the object of the present invention to eliminate the need for such pumps in systems for transferring the liquefied petroleum gas from the storage drums to the various transportation facilities or from one location to another.

In brief, my invention comprises a plurality of conduits connecting a source of liquefied gas with a storage facility and with a transportation facility or a second storage facility. The system includes necessary valves or other flow control means and an eductor which utilizes the available pressure of the liquefied petroleum gas as it comes from the producing units to transfer the liquefied petroleum gas from the storage facility to the transportation facility or to another storage facility.

The invention will be better understood by reference to the attached patent drawing, a detailed description of which now follows:

Conduit 10 is connected to a source of liquefied petroleum gas (not shown) which may be the gas plant of a petroleum refinery. The liquefied petroleum gas flows through conduit 10 to an eductor 11 and subsequently through the line 12 to storage drums 13 and 14 which are interconnected by means of conduit 15. A loading line 16 connects the storage drums 13 and 14 to a transportation facility such as the truck 17. The conduit 18 connects the truck 17 to the eductor 11 mentioned above.

In the normal operation of this system the valves 19, 20, 21 and 22 are all open. Consequently, the liquefied petroleum gas flowing from the conduit 10 through the eductor 11 will eject gas from the truck 17 and cause material in the drum 14 to be educted into the truck 17. The gas withdrawn from the truck 17 flows with the liquefied petroleum gas through line 12 into the storage drum 13. Part of this gas will condense under the pressure in the drum 13 until a new gas-liquid equilibrium is established. The eductor 11 will move relatively large quantities of product into the truck 17 with the pressure drop between the lines 10 and 12 supplying the motive force. When the truck 17 is loaded the valves 21 and 22 are closed and the truck 17 is disconnected from the conduits 16 and 18.

The eductor employed in this system is conventional, except for the obvious necessity that it be able to withstand the pressures encountered. Consequently, any eductor capable of withstanding the operating pressure may be employed.

It is obvious from this description that the present system provides for the handling of liquefied petroleum gas without resort to the conventional pumps or compressors. Hence, the system permits substantial capital savings in the construction of liquefied petroleum gas storage terminals. An additional advantage of this system is that the eductor has no moving parts; and, consequently, it is essentially leak proof. This is in contrast to the moving parts of conventional pumps and compressors which inherently are potential sources of leaks. The elimination of potential leaks by means of the present loading system is obviously beneficial from the standpoint of safety.

While I have described my invention in relation to the handling of liquefied petroleum gases, it will be obvious to those skilled in the art that the system is equally applicable to other liquefied gases such as liquid ammonia. Accordingly, this application for Letters Patent is intended to cover all such systems as would reasonably be included within the scope of the appended claims.

I claim:

1. A system for handling liquefied gas comprising a first conduit connecting a source of liquefied gas with a first storage vessel, said first conduit having an eductor operably associated therewith, a second conduit connecting the liquid-filled section of said first storage vessel with a second storage vessel, and a third conduit operably connecting the vapor-filled section of said second storage vessel with said eductor whereby the flow of liquefied gas through said first conduit and said eductor into said first storage vessel causes liquefied gas in said first storage vessel to be educted into said second storage vessel forcing any vapor in said second vessel into said first storage vessel.

2. The system of claim 1 wherein said liquefied gas is liquefied petroleum gas.

3. A system for handling liquefied gas comprising a first conduit connecting a source of liquefied gas with a stationary storage vessel, said first conduit having an eductor operably associated therewith, a second conduit connecting the liquid-filled section of said stationary storage vessel with a transportable storage vessel, and a third conduit operably connecting the vapor-filled section of said transportable storage vessel with said eductor whereby the flow of liquefied gas through said first conduit and said eductor into said stationary storage vessel causes liquefied gas in said stationary storage vessel to be educted into said transportable storage vessel forcing any vapor in said transportable vessel into said stationary vessel.

References Cited in the file of this patent

UNITED STATES PATENTS 2,856,950    Zars ------------------ Oct. 21, 1958